United States Patent
McEachern et al.

(10) Patent No.: US 9,466,086 B2
(45) Date of Patent: Oct. 11, 2016

(54) METHODS, SYSTEMS, AND COMPUTER READABLE MEDIA FOR AFFECTING USER ASSOCIATIONS IN OVER THE TOP (OTT) SERVICE PLATFORMS

(75) Inventors: James Angus McEachern, Stittsville (CA); Richard Taylor, Manotick (CA); Michael Leeder, Stittsville (CA); Carroll Louise Gray-Preston, Morrisville, NC (US)

(73) Assignee: GENBAND US LLC, Plano, TX (US)

( * ) Notice: Subject to any disclaimer, the term of this patent is extended or adjusted under 35 U.S.C. 154(b) by 326 days.

(21) Appl. No.: 13/239,548

(22) Filed: Sep. 22, 2011

(65) Prior Publication Data
US 2013/0080538 A1 Mar. 28, 2013

(51) Int. Cl.
*G06Q 50/00* (2012.01)
*G06Q 10/10* (2012.01)

(52) U.S. Cl.
CPC .............. *G06Q 50/01* (2013.01); *G06Q 10/10* (2013.01)

(58) Field of Classification Search
USPC .......................................... 706/206; 709/206
See application file for complete search history.

(56) References Cited

U.S. PATENT DOCUMENTS

| | | | | |
|---|---|---|---|---|
| 2002/0124053 A1* | 9/2002 | Adams | ..................... | G06F 9/468 709/216 |
| 2006/0015560 A1* | 1/2006 | MacAuley et al. | ........... | 709/206 |
| 2007/0207785 A1* | 9/2007 | Chatterjee | ......... | H04M 3/53333 455/414.1 |
| 2009/0300518 A1* | 12/2009 | Mock | ..................... | G06Q 10/10 715/753 |
| 2009/0307327 A1* | 12/2009 | Malik et al. | .................. | 709/206 |
| 2010/0273447 A1* | 10/2010 | Mann | ................ | H04M 1/72519 455/405 |
| 2011/0208814 A1* | 8/2011 | Bostrom et al. | .............. | 709/204 |
| 2011/0289153 A1* | 11/2011 | Hull et al. | .................... | 709/205 |
| 2013/0018948 A1* | 1/2013 | Douillet et al. | .............. | 709/204 |

OTHER PUBLICATIONS

Boyd, d. m., & Ellison, N. B., Social network sites: Definition, history, and scholarship 2007, Journal of Computer-Mediated Communication, 13(1), article 11. http://jcmc.indiana.edu/vol13/issue1/boyd.ellison.html accessed Apr. 30, 2013. 1-20.*

* cited by examiner

*Primary Examiner* — Douglas Blair
*Assistant Examiner* — Joseph M Cousins
(74) *Attorney, Agent, or Firm* — Fogarty, L.L.C.

(57) ABSTRACT

According to one aspect, the subject matter described herein includes a method for affecting user associations in over the top (OTT) service platforms. The method includes receiving a first message for initiating associations or disassociations between a first user and a second user of over the top (OTT) service platforms. The OTT service platforms are controlled and operated by distinct entities. The method also includes determining, using at least one of information in the first message and stored information, the OTT service platforms in which associations are to be established or disestablished. The method further includes sending at least a second message for establishing or disestablishing an association between the first user and the second user in the OTT service platforms.

19 Claims, 5 Drawing Sheets

METHODS, SYSTEMS, AND COMPUTER READABLE MEDIA FOR AFFECTING USER ASSOCIATIONS IN OVER THE TOP (OTT) SERVICE PLATFORMS

TECHNICAL FIELD

The subject matter described herein relates to facilitating communications. More specifically, the subject matter relates to methods, systems, and computer readable media for affecting user associations in OTT service platforms.

BACKGROUND

Modern telecommunications networks offer users a vast array of options for connecting and interacting with one another. In addition to choices provided by telecommunications providers themselves, users can now utilize a variety of independently developed products and services that run 'on top' of the infrastructure maintained by the telecommunications industry. These independently developed products and services are commonly referred to as over-the-top (OTT) services because they are not developed with a specific telecommunications provider's network in mind, but rather are designed to interconnect users via a provider-independent platform.

While the rise of OTT services has provided users with increased flexibility by allowing them to separate the manner in which they interact from their respective telecommunications providers, it has also presented new challenges to the telecommunications providers that maintain the networks over which OTT services run. For example, provider revenue models that charge based on the utilization of provider services (e.g., price per voice minute, price per text message) may be incompatible with OTT service platforms that utilize the provider's infrastructure to provide roughly equivalent services at 'no cost' to the consumer (e.g., peer-to-peer voice services, instant messaging).

Despite the challenges presented to network providers by the rise in popularity of OTT services, the paradigm shift also presents telecommunications providers with new opportunities. Like other providers, OTT service providers are subject to the 'network effect.' As a result, OTT service providers are primarily concerned with expanding their user base and hesitant to develop functionality for interacting with other OTT service providers. Often OTT service providers limit their interoperability to assisting users in switching from a competing platform, i.e., by providing a new user with the option to import contact information from another OTT service platform. Unlike their OTT service provider counterparts, telecommunications providers are ideally situated between their end users and the intersection of these various OTT service platforms. From this vantage point telecommunications providers can distinguish themselves by developing and implementing functionality that leverages information from multiple OTT service platforms.

Accordingly, a need exists for methods, systems, and computer readable media for affecting user associations in OTT service platforms.

SUMMARY

According to one aspect, the subject matter described herein includes a method for affecting user associations in OTT service platforms. The method includes receiving a first message for initiating associations or disassociations between a first user and a second user of over the top (OTT) service platforms. The OTT service platforms are controlled and operated by distinct entities. The method also includes determining, using at least one of information in the first message and stored information, the OTT service platforms in which associations are to be established or disestablished. The method further includes sending at least a second message for establishing or disestablishing an association between the first user and the second user in the OTT service platforms.

According to another aspect, the subject matter described herein includes a system for affecting user associations in OTT service platforms. The system includes at least one communications interface configured to receive a first message for initiating associations or disassociations between a first user and a second user of OTT service platforms. The OTT service platforms are controlled and operated by distinct entities. The system further includes an association module configured to determine, using at least one of information in the first message and stored information, the OTT service platforms in which associations are to be established or disestablished and to initiate sending at least a second message for establishing or disestablishing an association between the first user and the second user in the OTT service platforms.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term 'node' refers to a physical computing platform including one or more processors and memory.

As used herein, the terms 'function' or 'module' refer to software in combination with hardware (such as a processor) and/or firmware for implementing features described herein.

BRIEF DESCRIPTION OF THE DRAWINGS

The subject matter described herein will now be explained with reference to the accompanying drawings of which.

DETAILED DESCRIPTION

Figure 1:
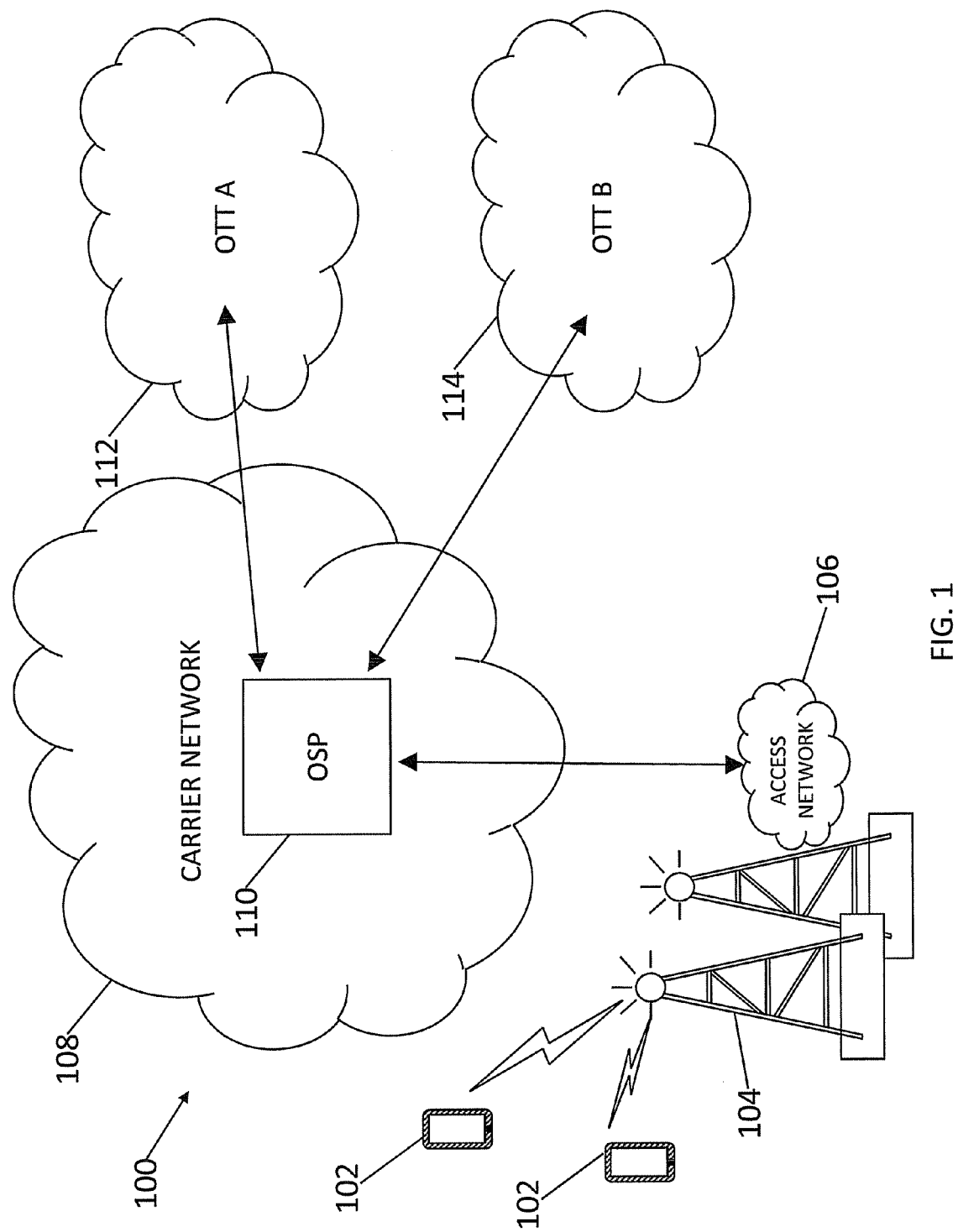
FIG. 1 is a block diagram illustrating an exemplary network for affecting user associations in OTT service platforms according to an embodiment of the subject matter described herein.

Methods, systems, and computer readable media for affecting user associations in over the top (OTT) service platforms are provided. According to one aspect, the present subject matter described herein may be used to initiate associations between users across OTT service platforms. For example, in response to interfacing with a user interface (e.g., pressing a 'Befriend' soft key of graphical user interface (GUI)), a user device may generate and send a association request message to a network node (e.g., an OTT service proxy (OSP) node). The association request message may be for initiating associations between the first user and the second user of the OTT service platforms. The network node may receive the association request message and determine, using at least one of information in the association request message and stored information, the OTT service platforms in which associations are to be established. The network node may initiate sending at least an association message for associating the first user and the second user in the OTT service platforms.

According to another aspect, the present subject matter described herein may be used to initiate disassociations between users across OTT service platforms. For example, in response to interfacing with a user interface (e.g., pressing a 'De-friend' soft key of GUI), a user device may generate and send a disassociation request message for initiating disassociations between the first user and the second user of the OTT service platforms to a network node (e.g., an OSP node). The network node may receive the disassociation request message and determine, using at least one of information in the disassociation request message and stored information, the OTT service platforms in which associations are to be disestablished. The network node may initiate sending at least a disassociation message for disassociating the first user and the second user in the OTT service platforms.

Advantageously, the present subject matter described herein can improve user experience by automating, as much as possible, initiating associations or disassociations between two users in or across various OTT service platforms (e.g., a social matrix). Further, the present subject matter described herein can improve efficiency by allowing a user to initiate associations or disassociations with a contact in multiple OTT service platforms during or contemporaneously with an related interaction/event (e.g., a voice call or a short message service (SMS) communication with the contact).

Additionally, the present subject matter described herein may provide a framework for implementing enhanced communications services that span or interact with various OTT service platforms. For example, by initiating 'friending' or 'following' in multiple OTT service platforms (e.g., social networks), a user may receive a contact's social information (e.g., personal information, social network status, wall information, recent posts, presence states, location, maps, etc.) from multiple social networking services via a blended communications application running on a user device. Using the blended communications application, the user may interact with the contact via any of these social networking services. As such, the present subject matter described herein may provide a social networking launch pad for users to perform various social interactions via various OTT service platforms using a common interface. By providing a social networking launch pad, network operators can establish a platform for introducing future revenue opportunities. For example, network operators may include new services and/or advertising that complements and cooperates with OTT service platforms and/or their providers.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a block diagram illustrating an exemplary network for affecting user associations in OTT service platforms according to an embodiment of the subject matter described herein. Referring to FIG. 1, network 100 includes various exemplary components, modules, and/or devices associated with at least one of an access network 106, carrier network 108, and an OTT service platform (e.g., OTT A 112 or OTT B 114). For example, network 100 may include various exemplary components that are involved in content delivery at an access edge, a peering edge, or network aggregation point.

Nodes or elements within the network 100 may communicate various types of traffic, e.g., signaling, management, and user data, using various protocols. Access network 106 represents a network for providing mobile data services to user equipment (UE) 102. For example, access network 106 may include a radio access network. In this example, the radio access network may represent a wireless or radio access portion (e.g., a Universal Mobile Telecommunications System (UMTS), an Evolved Universal Terrestrial Radio Access Network (e-UTRAN), a Code Division Multiple Access (CDMA), an Evolution Data-Only (EV-DO), a Worldwide Interoperability for Microwave Access (Wi-MAX), or a global system for mobile communications (GSM) radio access network (RAN)). In another example, access network 106 may include a fixed broadband network and/or a cable network. Access network 106 may include nodes for sending and receiving communications with other networks or nodes, such as carrier network 108. For example, access network 106 may include a gateway general packet radio service (GPRS) support node (GGSN), a packet data serving node (PDSN), a home agent (HA), a gateway, or a packet data network (PDN) gateway.

UE 102 may represent any device capable of receiving or sending communications (e.g., social interactions) using network 100. For example, UE 102 may include a phone, a computer, a tablet computer, a smartphone, a customer premises equipment (CPE), or other user device. Access node (AN) 104 represents a functional entity for receiving and/or sending messages to or from UE 102, e.g., using wireless, cable, xDSL, or fiber technology. For example, UE 102 may communicate with a mobile access network via AN 104. In the example, AN 104 may be a base transceiver station (BTS), a node B, an evolved node B, or an access node.

Carrier network 108 may represent a portion of communications network 100. For example, carrier network may represent a mobile packet core network, such as a GPRS or evolved Packet Core (ePC) network, or other core network, such as an IP Multimedia Subsystem (IMS) network. Carrier network 108 may include one or more OTT service proxy (OSP) nodes 110 (also referred to as OTT service nodes).

OSP node 110 may represent any entity for interacting with OTT service platforms on behalf of or in association with users or UE 102. OSP node 110 may be co-located at or integrated with UE 102 (e.g., a module or component of UE 102) or may be located at a node distinct from UE 102 (e.g., a server in carrier network 108). For example, OSP node 110 may act as a proxy for communications between UE 102 and an OTT service platform (e.g., OTT A 112). In this example, OSP node 110 may receive social interaction information (e.g., an association message) from UE 102. OSP node 110 may use this information (e.g., update a data structure that represents a user's social interaction history) before forwarding an association establishing message to the OTT service platform. In another example, OSP node 110 may be associated with probes or monitoring modules that identify social interaction information and send a copy of the social interaction information to OSP node 110 for processing. For instance, monitoring modules may be located at various nodes or elements in communications network 100, such as an authentication, authorization, and accounting (AAA) server, a dynamic host configuration protocol (DHCP) server, a deep packet inspection (DPI) node, a gateway, a session initiation protocol (SIP) server, a call session control function (CSCF) and/or a Policy and Charging Rules Function (PCRF).

OSP node 110 may include functionality for mapping master identities (e.g., unique user identifiers) to various OTT service platforms. In one example, a master identity of a contact may be derived from a communications event (e.g., a phone call). In another example, a master identity of a contact may be derived from stored information (e.g., a phone contact list). OSP node 110 may store this master identity along with associated OTT service platforms, e.g., OTT service platforms that are utilized by the user identified by the master identity.

OSP node 110 may include functionality for initiating associations or disassociations between users of OTT service platforms (e.g., Facebook, Google+, MySpace, Twitter, LinkedIn, Flickr, AIM, eHarmony, etc.). For example, OSP node 110 may receive an association request message from UE 102. The association request message may be for initiating associations or disassociations between users in one or more OTT service networks. Using information in the request and/or other information (e.g., master identity mappings), OSP node 110 may identify or determine OTT service platforms to establish or disestablish associations and may generate and send relevant messages for establishing or disestablishing associations in the determined OTT service platforms.

In some embodiments, establishing or disestablishing associations includes following or un-following users that are already associated with and/or in OTT service platforms. For example, a first user and a second user may be listed connections in LinkedIn and/or friends in Facebook. However, the first user may wish to receive status or other information about the second user during communications interactions involving a user device (e.g., a mobile handset). As such, the first user may send an association request message to OSP node 110. The association request message may be for initiating following of the second user via the user device and/or a related application. Using information in the request and/or other information (e.g., master identity mappings), OSP node 110 may identify or determine a user device that is to receive social information related to one or more user associations. OSP node 110 may generate and send relevant messages for requesting and/or receiving social information from the determined OTT service platforms. OSP node 110 may also send or provide the social information to the user device.

In some embodiments, functionality described herein for initiating associations or disassociations may be performed by additional and/or different nodes (e.g., UE 102 or a gateway). For example, UE 102 (e.g., a tablet computer or mobile phone) may include a blended communications application. The blended communications application may include functionality for receiving communications or interaction information. The blended communications application may also include functionality for determining OTT service platforms to establish or disestablish associations and may generate and send relevant messages for establishing or disestablishing associations in the determined OTT service platforms.

OTT A 112 and OTT B 114 represent OTT service platforms. OTT service platforms may include any suitable entities (e.g., servers or other computing platforms) for providing OTT services (e.g., to UE 102). For example, an OTT service platform may be any platform that offers services to users of different telecommunications providers independent of the particular telecommunications provider being utilized. Exemplary OTT service platforms may include a peer-to-peer voice over Internet protocol (VoIP) provider (e.g., Skype), an instant messaging service (e.g., America online instant messenger), an email service (e.g., Google's Gmail), a social networking platform (e.g., Facebook, MySpace, Friendster, Twitter), a really simple syndication (RSS) feed service platform (e.g., an RSS feed provided by a news organization), a social networking service platform, a media hosting service platform, a business networking service platform, or a media streaming service platform.

Some OTT services may be provided, maintained, and/or controlled by entities separate from a communications network provider of an OTT service subscriber. For example, a Verizon wireless subscriber may receive and send communications to a Facebook service platform, e.g., a Facebook server. In this example, communications network 100 is controlled by Verizon Wireless and the OTT service is controlled by Facebook. Other OTT services may be provided, maintained, and/or controlled by a communications network provider of an OTT service subscriber. For example, a Verizon wireless subscriber may receive services associated with a V Cast video on demand service, where communications network 100 and the OTT service are controlled by Verizon Wireless.

Figure 2:
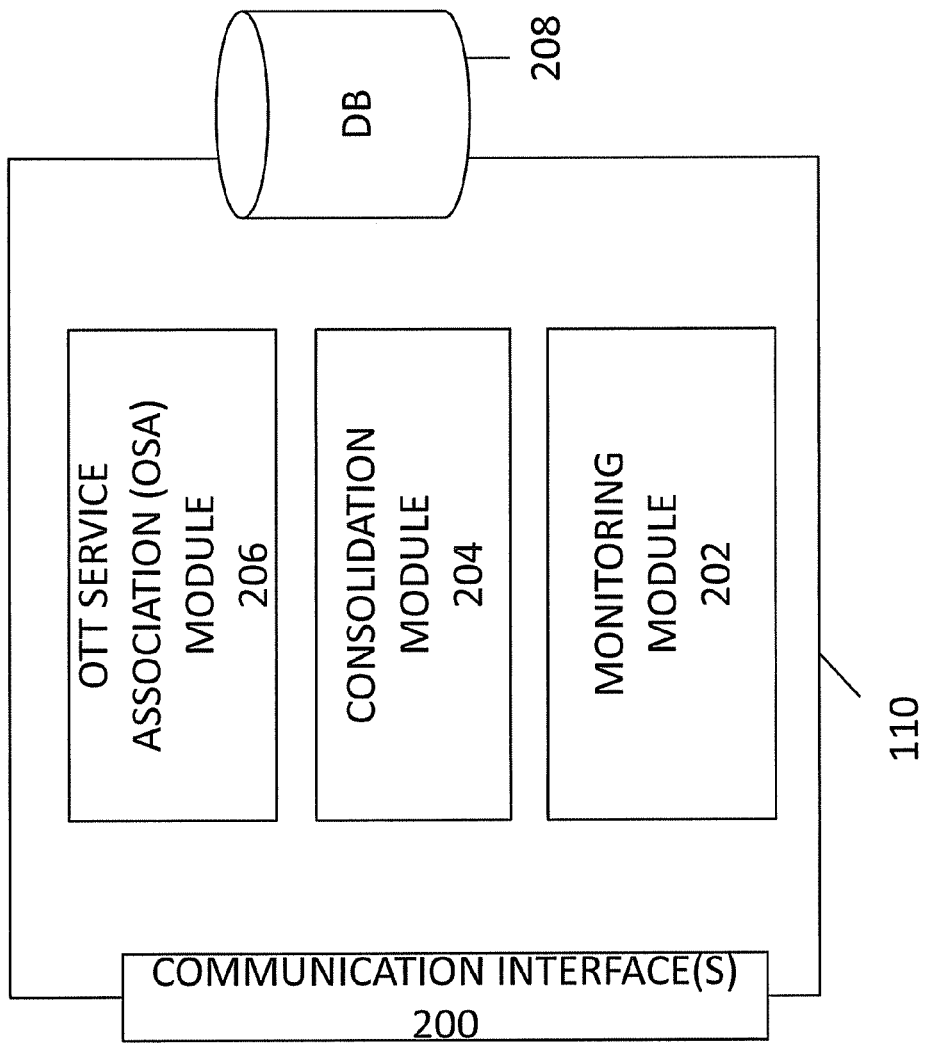
FIG. 2 is a block diagram illustrating an exemplary node for affecting user associations in OTT service platforms according to an embodiment of the subject matter described herein.

FIG. 2 is a block diagram illustrating an exemplary node for affecting user associations in OTT service platforms according to an embodiment of the subject matter described herein. Referring to FIG. 2, OSP node 110 may be co-located at or integrated with UE 102 or may be a node distinct from UE 102. OSP node 110 may include one or more communications interface(s) 200, a monitoring module 202, a consolidation module 204, an OTT service association (OSA) module 206, and a database 208. Communications interface(s) 200 may be any suitable entity usable for communicating with one or more nodes, networks, and/or OTT service platforms. For example, communications interface(s) 200 may be configured to communicate with various OTT service platforms and communications nodes, e.g., using an extensible messaging and presence protocol (XMPP), extensible markup language (XML), SOAP, hypertext transfer protocol (HTTP), Internet protocol (IP), session initiation protocol (SIP), signaling system number 7 (SS7), or other protocols.

Monitoring module 202 may be any suitable entity (e.g., software executing on a processor) for observing, identifying, copying, and/or logging social interaction information (e.g., as determined by rules and/or triggers). Monitoring module 202 may identify social interaction information associated with various communications services (e.g., OTT services) and may use or provide the information for storage or processing. For example, monitoring module 202 may receive various communications destined for or originating from UE 102. Monitoring module 202 may identify social interaction information and send a copy of the social interaction information to correlation module 204. For example, monitoring module 202 may recognize all new social interactions associated with a user of UE 102 (e.g., phone calls, text messages, tweets, wall posts, friend requests, etc.). Monitoring module 202 may store and/or provide this information, or portions thereof, to consolidation module 204 for processing.

Consolidation module 204 may be any suitable entity (e.g., software executing on a processor) for receiving, generating, correlating, and/or consolidating social interaction information. For example, consolidation module 204 may receive social interaction information associated with various sources (e.g., Facebook, Twitter, SS7 network, mobile phone network, Google Talk, SIP telephony service, etc.). The information may be received via communications interface(s) 200 and/or received from monitoring module 202. For example, communications interface(s) 200 may be configured to receive XMPP messages from a Google Talk server and other messages from Facebook or Twitter. Communications interface(s) 200 may also be configured to receive SIP, SS7, or other telephony messages from carrier network 108. Consolidation module 204 may correlate the received information (e.g., based on master identities or user information) and generate or update information stored in a data structure that represents social interaction or communication history.

Consolidation module 204 or another module may store user credential information (e.g., in database 208) for interacting with one or more communications services. For example, a user may enter login credentials associated with various communications services (e.g., SIP telephony, social networking services, etc.). Consolidation module 204 may store the login credentials and may log-in and/or register with the one or more communications services. Consolidation module 204 may interact with each of these services to retrieve current or past social interaction information. For example, retrieval may be optimized by retrieving only information that has changed (e.g., since the last time social interaction information was retrieved). It will be appreciated that the retrieved information may vary, e.g., depending on the communications service and/or service type. For instance, retrieved information from an OTT IM service may include changes to buddy lists and new messages, whereas retrieved information from Twitter may provide new followers and recent tweets made from other devices.

OSA module 206 may be any suitable entity for performing one or more aspects associated with initiating establishing or disestablishing associations between users in one or more OTT service platforms. OSA module 206 may communicate (e.g., via the at least one communications interface 200) with various OTT service platforms (e.g., OTT A 112 and OTT B 114), nodes (e.g., UE 102) and/or components in OSP node 110 (e.g., database 208 and consolidation module 204). For example, OSA module 206 may receive a request message originating from UE 102. The request message may be for initiating associations or disassociations between a first user and a second user of OTT service platforms.

OSA module 206 may determine appropriate OTT service platforms for establishing or disestablishing associations between users of OTT service platforms. OSA module 206 may also determine appropriate user devices or applications executing on the user devices to associate with one or more user associations so as to provide relevant social information (e.g., status updates, wall posts, and profile pictures) via the user devices or applications. Exemplary information for making such determinations may include information from a received message, derived information from a received message, and/or stored information. For example, an association request message from UE 102 may include a user identifier, a phone number, a profile identifier, a social network user identifier, a list of allowed social networks, or a list of excluded social networks. In another example, a user identifier may be derived information based on a phone number, a profile identifier, and/or a social network user identifier. Stored information may include social interaction information of one or more users (e.g., in database 208).

OSA module 206 may query a table, module (e.g., consolidation module 204), or database 208 for OTT service platforms associated with a first user. OSA module 206 may also query a table, module, or database 208 for OTT service platforms associated with a second user. Querying the table, module, or database 208 may include using information in the request message and/or derived information. For example, a user identifier in the request message may identify a master identity. In another example, a phone number or a social network user identifier may be used to derive a master identity. A master identity may be a unique identifier (e.g., a social security number or a name and a phone number) and may identify a person or contact. Using a master identity, an associated identifier, and/or other information (e.g., a profile identifier) when querying the table or database 208 may identify associated OTT service platforms. For example, OSA module 206 may query a user credentials table stored in database 208 for determining different OTT service platforms associated with a given user and/or profile.

Profiles may include personas (e.g., personal, office, gaming, anonymous, etc.) of a user and/or identities (e.g., screen names or handles) used in OTT service platforms. A profile or persona may include policies for receiving, providing, managing, or displaying interaction information. For example, if a contact or a related association is linked with a particular profile or persona, policies of the particular profile or persona may dictate various aspects of the relationship, e.g., amount or type of information that may be shared. For instance, if a contact is associated with an office profile, education background may be shared but not age or religion. In another instance, user availability and/or user location information may be withheld except from contacts associated with a family profile.

Contacts and their interaction information (e.g., messages, pictures, friends, videos, networks, etc.) may be related to one or more profiles. For example, an office profile for a first user may be associated with particular contacts, social networks, and/or social network accounts, while a personal profile for the first user may be associated with different contacts, social networks, and/or social network accounts. For instance, an office profile associated with a master identifier 'David Johnson 555-456-6753' may include information and policies regarding Facebook and LinkedIn Accounts associated with a login identifier 'David Johnson' and a personal profile associated with the master identifier 'David Johnson 555-456-6753' may include information and policies regarding MySpace, PlayStation network (PSN), and Twitter Accounts associated with the login identifier 'DJSportz674'.

Depending on policies (e.g., user configured options), stored information, and/or information in a received message (e.g., from UE 102), OSA module 206 may determine appropriate OTT service platforms for which user associations are to be established or disestablished. In some embodiments, OSA module 206 may determine which OTT service platforms are mutually shared or utilized by users that are to be associated. In such embodiments, OSA module 206 may initiate communications (e.g., one or more Friend request messages) to establish or disestablish associations in the mutually shared OTT service platforms. In an alternate embodiment, where OSA module 206 determines an OTT service platform not mutually shared, OSA module 206 may initiate communications to register the non-registered user in the OTT service platform. In this alternative embodiment, after registering the user in the OTT service platform, OSA module 206 may initiate communications to establish or disestablish associations in the newly shared OTT service platform.

Database 208 may be any suitable entity (e.g., non-transitory computer readable media) for storing interaction information. For example, stored information may include data structures representing social interactions, associations between users (e.g., master identities) and profiles, associations between users and OTT service accounts (e.g., identities or accounts in social networks), associations between user devices and/or related applications and user associations, or user credentials usable to log into OTT service platforms. Database 208 may be accessible to various nodes and/or modules. Database 208 may be co-located at OSP node 110 or located at a node distinct from OSP node 110.

In some embodiments, the functionality described herein may be located on a single device or computing platform or may be distributed across multiple devices or computing platforms. For example, monitoring module 202, consolidation module 204, OSA module 206, and database 208 may each be located on distinct nodes in network 100 and may interact as a collaborative system.

Figure 3:
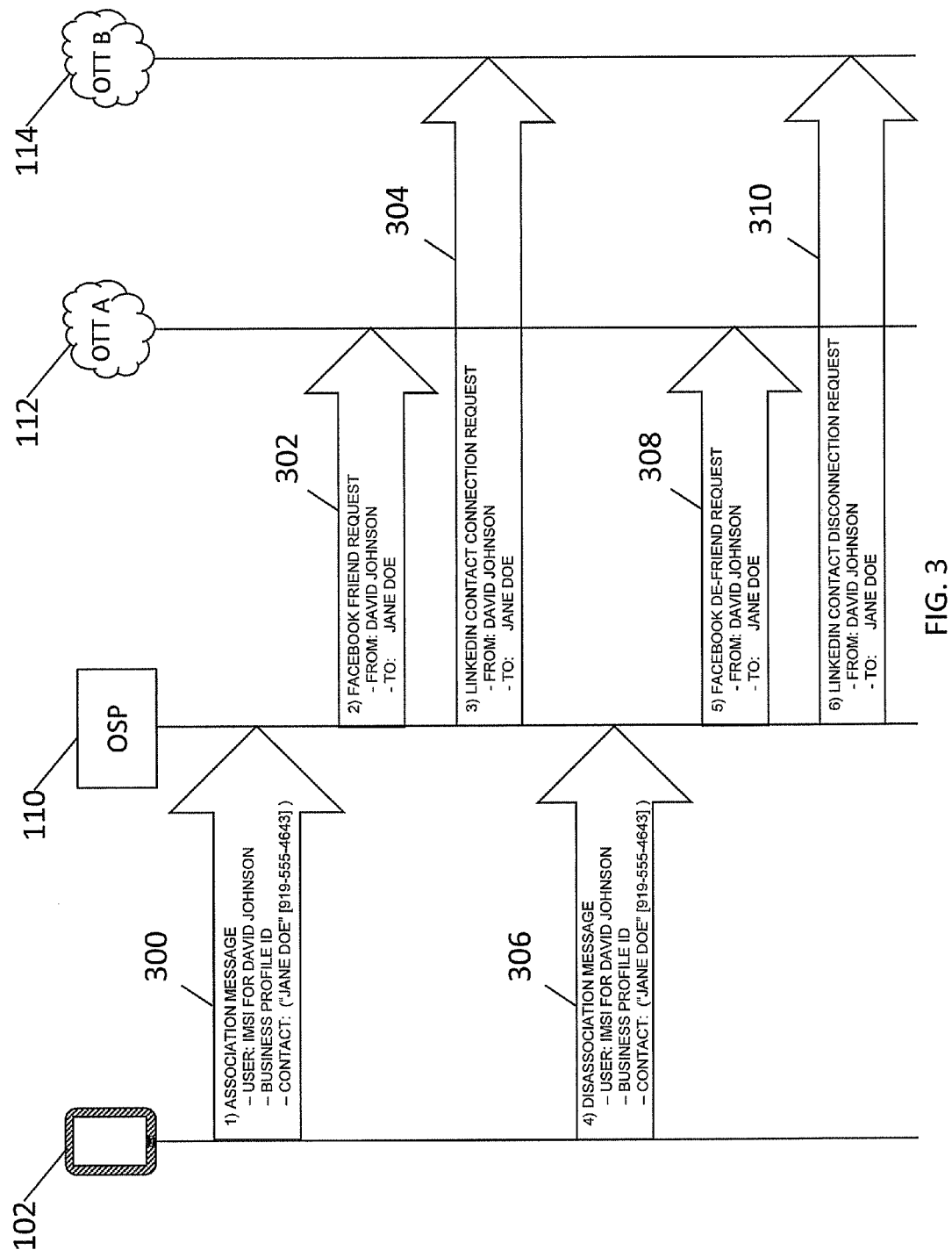
FIG. 3 is a message flow diagram illustrating exemplary messages for affecting user associations in OTT service platforms according to an embodiment of the subject matter described herein.

FIG. 3 is a message flow diagram illustrating exemplary messages for affecting user associations in OTT service platforms according to an embodiment of the subject matter described herein. Referring to FIG. 3, in response to or during an interaction or event (e.g., a VoIP call, a multimedia conference session, reading a website, viewing a phone contact list, reading a text message, reading an email, watching a video, etc.), a user may wish to associate (e.g., 'follow,' 'friend,' or 'connect') with another person or entity (e.g., a group or business) in or across multiple OTT service platforms (e.g., social networks). For example, the user may press a button, select a soft key, or otherwise interact with a user interface (e.g., provided by a blended communications application running on UE 102) to initiate sending an association message 300. In another example, sending an association message 300 may be performed dynamically or based on triggers or other information (e.g., derived from profile policies). For instance, a blended communications application running on UE 102 may befriend work contacts of a user involved in a conference call automatically, such as to retrieve a picture or avatar for the conference call's participants and/or other relevant information, e.g., current job, location, and/or education of the participants.

In step 1, association message 300 may be sent to OSP node 110 for establishing associations between two users in multiple OTT service platforms (e.g., OTT A 112 and OTT B 114). Association message 300 may include an international mobile subscriber identity (IMSI) or other information (e.g., phone number) for identifying a first user. Association message 300 may include a profile identifier for identifying a profile associated with the first user. Association message 300 may also include information for identifying a second user. For example, as illustrated in FIG. 3, association message 300 may include a name and a phone number. In some embodiments, association message 300 may include additional information, such as a set of OTT service platforms that are to be excluded or included when establishing or disestablishing associations. In such embodiments, the set of OTT service platforms to be excluded or included may be determined by requesting input from the user before sending association message 300.

OSP node 110 may receive association message 300 and determine, using information in the received message or other information, appropriate OTT service platforms for performing associations. OSP node 110 may query one or more databases to determine the appropriate OTT service platforms. For example, OSP node 110 may use user identifying information (e.g., the IMSI or the name and phone number in association message 300) to determine the OTT service platforms associated with each user. In another example, OSP node 110 may trigger UE 102 to resolve identity conflicts (e.g., if there are multiple common entries for the same contact name in a given contact list) by requesting input from one or more users. In yet another example, OSP node 110 or another node (e.g., UE 102) may query a user for additional information, e.g., additional social network identifiers or login credentials.

In an embodiment where OSP node 110 or related functionality is integrated with UE 102, association message 300 and/or other messages between UE 102 and OSP node 110 or OSA module 206 may be transmitted within UE 102. For example, association message 300 may be generated by a user interface or a blended communications application running on UE 102 in response to a user interacting with the user interface. Association message 300 may be sent internally (e.g., via a communications bus) to another module (e.g., OSA module 206) at UE 102 for further processing. An acknowledgement or response message may be sent internally from the module to the user interface for displaying to the user.

After determining appropriate OTT service platforms, OSP node 110 or other node (e.g., UE 102) may send one or more messages for establishing associations between the users in the OTT service platforms. For example, in embodiments where OSP node 110 sends an association establishing message (e.g., a friend request message), OSP node 110 may log into OTT A 112 using stored user information before sending an association establishing message. For instance, OSP node 110 may use an application protocol interface (API) and/or a particular protocol (e.g., SOAP, XML, HTTP, SIP, etc.) for interacting with OTT A 112. In an alternate embodiment, OSP node 110 may determine appropriate OTT service platforms and inform UE 102. In this alternate embodiment (not shown), after being informed of the appropriate OTT service platforms by OSP node 110, UE 102 may send one or more association establishing messages to the appropriate OTT service platforms.

In step 2, a Facebook friend request 302 may be sent to OTT A 112. The Facebook friend request 302 may be sent from OSP node 110 and include user identifiers or other information for identifying which users and/or profiles are to be associated. Additional messages (not shown) may be communicated between OTT A 114, OSP node 110, and/or other nodes (e.g., UEs 102) to complete establishing the association. For example, before establishing an association between a user and a contact, the contact may need to accept the user as a friend (i.e., accept the Facebook friend request) in the OTT service platform.

In step 3, a LinkedIn contact connection request 304 may be sent to OTT B 114. The LinkedIn contact connection request 304 may be sent from OSP node 110 and include user identifiers or other information for identifying which users and/or profiles are to be associated. Additional messages (not shown) may be communicated between OTT B 114, OSP node 110, and/or other nodes to complete establishing the association.

Once associations between are established in the OTT service platforms, a user may be presented with social interaction information about the other user. For example, current information (e.g., status information, presence data, messages posts, and location data) from a contact may be provided separately via LinkedIn and Facebook apps or the information associated with LinkedIn and Facebook may be merged into a blended summary of the contact's social network activities (e.g., via a blended communications application running on UE 102). Additionally, a user may be provided access to available historic content associated the befriended contact such as tweets, posts, pictures, and video clips. As such, the subject matter disclosed herein relieves the user from having to explicitly visit individual social networking sources and manually retrieve the associated data.

Similarly, one or more disassociations may be performed using one or more aspects of the present subject matter disclosed herein. For example, after establishing associations between users in one or more OTT service platforms, a user of UE 102 may decide to initiate disestablishing an association between users. In this example, the user may press a soft button or key labeled 'De-friend' or 'Un-follow' to generate and send a disassociation message 306. In another example, a disassociation message may be generated and sent dynamically, e.g., in response to a particular communications event or after a particular time period. For instance, a user may befriend a group of engineers for work using a blended communications application. The application may include a de-friend trigger option, such as a six week time period. At the end of six weeks, the associations between the workgroup may be disestablished automatically. In another instance, a disassociation message may be sent after a conference call or series of conference calls are completed between users.

In step 4, disassociation message 306 may be sent to OSP node 110 for disestablishing associations between two users in multiple OTT service platforms (e.g., OTT A 112 and OTT B 114). Disassociation message 300 may include an international mobile subscriber identity (IMSI) or other information (e.g., phone number) for identifying a first user. Disassociation message 300 may include a profile identifier for identifying a profile associated with the first user. Disassociation message 300 may also include information for identifying a second user. For example, as illustrated in FIG. 3, disassociation message 300 may include a first and last name and a phone number. In some embodiments, disassociation message 300 may include additional information, such as a set of OTT service platforms that are to be excluded or included when establishing or disestablishing associations.

OSP node 110 may receive disassociation message 300 and determine, using information in the received message or other information (e.g., user credential stored in database 208), appropriate OTT service platforms for performing disassociations. OSP node 110 may query one or more databases to determine the appropriate OTT service platforms. After determining appropriate OTT service platforms, OSP node 110 or other node (e.g., UE 102) may send one or more messages for disestablishing associations between the users in the OTT service platforms.

In step 5, a Facebook de-friend request 308 may be sent to OTT A 112. The Facebook de-friend request 308 may be sent from OSP node 110 and include user identifiers or other information for identifying which users and/or profiles are to be disassociated. Additional messages (not shown) may be communicated between OTT A 112, OSP node 110, and/or other nodes to complete disestablishing the association.

In step 6, a LinkedIn contact disconnection request 310 may be sent to OTT B 114. The LinkedIn contact disconnection request 310 may be sent from OSP node 110 and include user identifiers or other information for identifying which users and/or profiles are to be disassociated. Additional messages (not shown) may be communicated between OTT B 114, OSP node 110, and/or other nodes to complete disestablishing the association.

While FIG. 3 describes an exemplary set of messages for an embodiment involving OSP node 110, it will be appreciated that additional and/or different messages may be used. Further, in some embodiments, functionality of OSP node 110 may be performed by additional and/or different nodes (e.g., UE 102 or a gateway).

Figure 4:
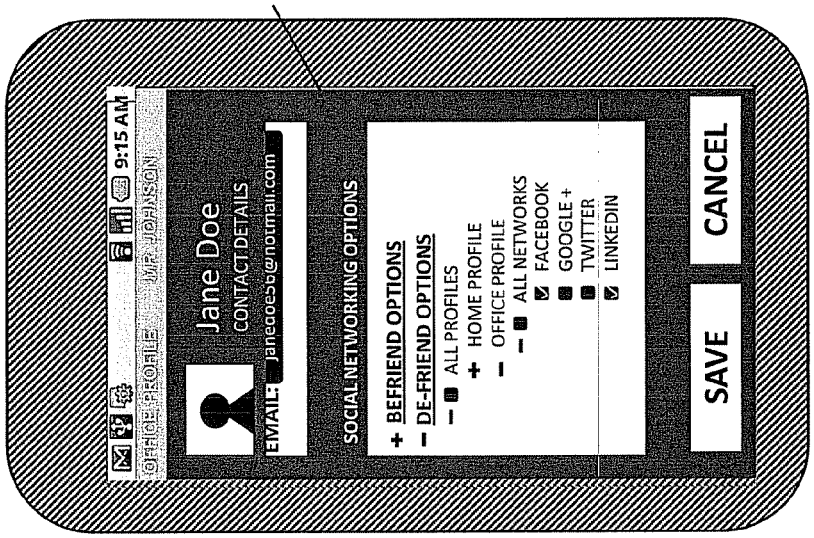
FIG. 4 is a diagram illustrating two views of a user interface for affecting user associations in OTT service platforms according to an embodiment of the subject matter described herein.
Figure 4:
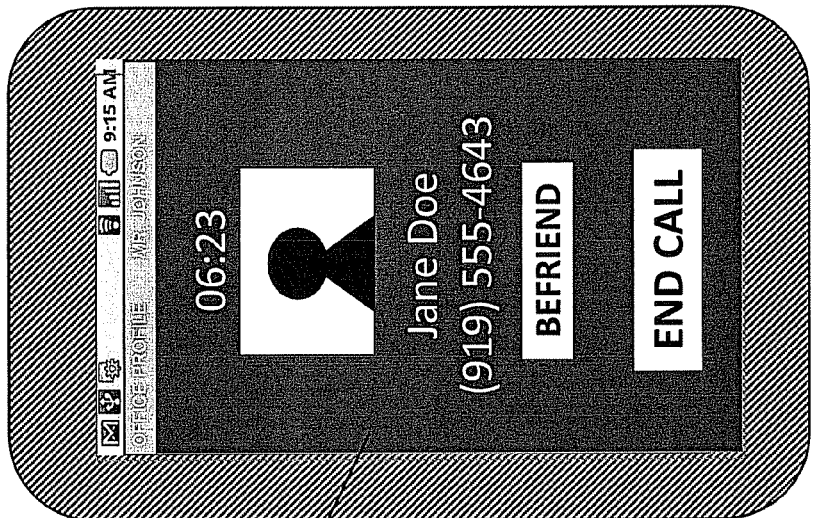

FIG. 4 is a diagram illustrating two views of a user interface for affecting user associations in OTT service platforms according to an embodiment of the subject matter described herein. Referring to FIG. 4, views 400 and 402 include screen shots of an exemplary blended communications application running on UE 102. In particular, view 400 depicts a screen shot of a call in progress between a user 'Mr. Johnson' and a contact 'Jane Doe'. View 400 also depicts an office profile as being associated with the communications event. View 400 also shows a 'Befriend' button or soft key. The 'Befriend' soft key may be used (e.g., pressed by a user) to initiate associating the user and a contact (e.g., the other call participant) in various OTT service platforms. For example, after a user selects the 'Befriend' button of view 400, an association message may be sent to OSP node 110. The association message may include user identifying information for both the user and the contact (e.g., derived from the call). The association message may also include information indicating that the association is related to an office profile for 'David Johnson'.

In another view (not shown), where a call is in progress with a contact that is already befriended, a 'De-friend' soft key or similar interface element may be available. For instance, the 'De-friend' soft key may be used (e.g., pressed by a user) to initiate disassociating the user and a contact (e.g., the other call participant) in various OTT service platforms.

The blended communications application represented, in part, by views 400 and 402 may allow a user to also customize the functionality linked to the 'Befriend' and 'De-friend' soft keys or similar user elements. For example, the blended communications application may include an options or configurations interface for specifying how or when an association or disassociation message is to be generated and sent to OSP node 110 or other node. A configurations interface may also include options to limit or restrict which user profiles and/or which OTT service platforms are associated with the 'Befriend' and 'De-friend' soft keys or similar user elements.

View 402 depicts a configurations interface for manipulating and/or displaying various social networking options. In particular, view 402 includes a 'Befriend Options' list and a 'De-friend Options' list which may include options respectively associated with 'Befriend' and 'De-friend' soft keys. Each list is associated with GUI elements ('+' and '−' icons), that if selected, may expand or contract option details. In the expanded 'De-friend Options' list, profiles associated with a user may be displayed. Each profile may be associated with various OTT service platforms (e.g., social networks).

In some embodiments, a user may select (e.g., using a check box or other interface element) which OTT service platforms are associated with a given soft key. For example, as illustrated in view 402, under the 'De-friend Options' list, Facebook and LinkedIn are selected for an office profile. In this example, these options may indicate that if a user selects to de-friend a contact using a 'De-friend' soft key, a disassociation message may be generated and sent for initiating disassociations between the user and the contact in Facebook and LinkedIn.

It will be appreciated that views 400 and views 402, including the 'Befriend' and 'De-friend' interface elements and available options, are for illustrative purposes, other user elements may be used and/or labeled differently. For example, an active follow list may be used to display current associations between a user and contacts. To disassociate from a particular contact, the user may delete, remove, or drag the contact or related identifier from the active follow list.

Figure 5:
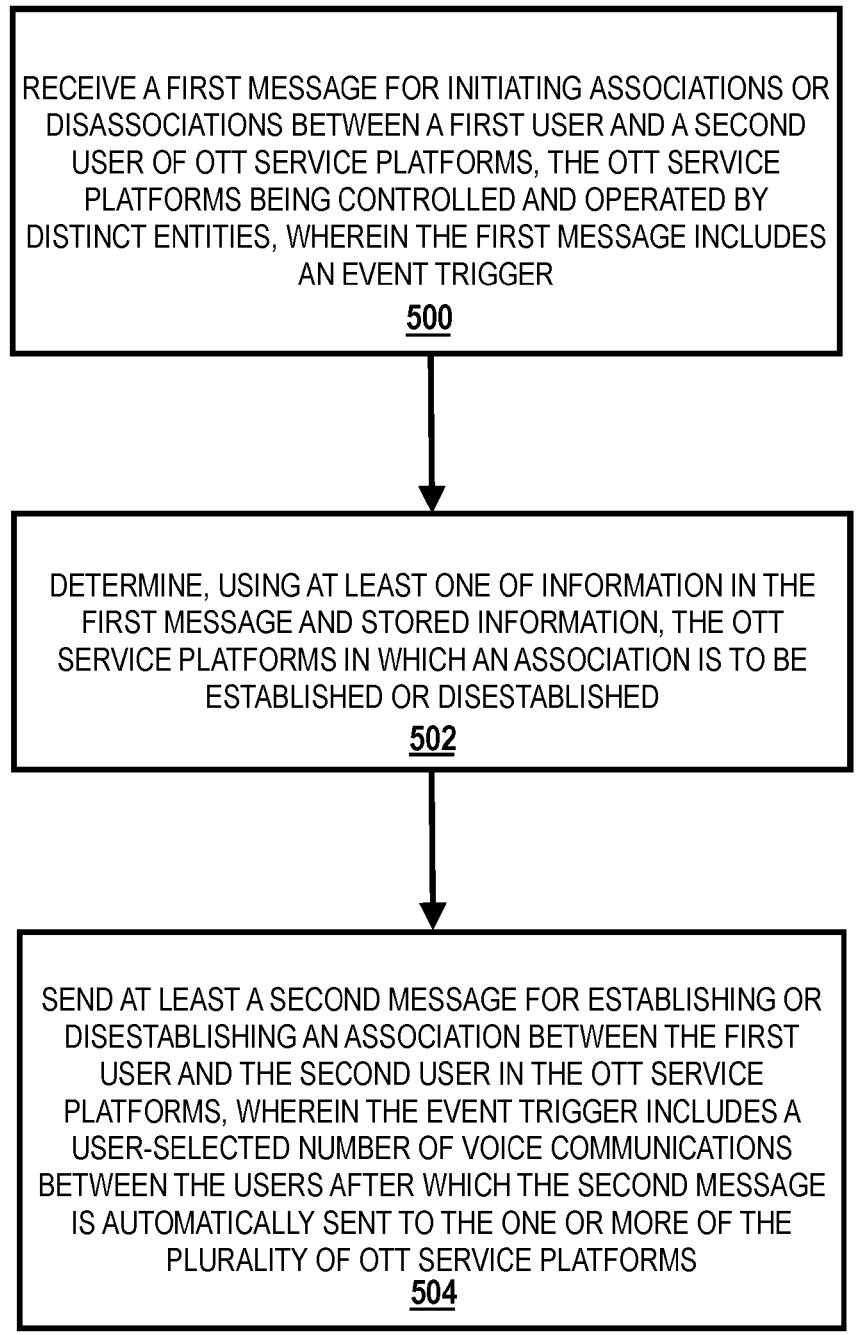
FIG. 5 is a flow chart illustrating an exemplary process for affecting user associations in OTT service platforms according to an embodiment of the subject matter described herein.

FIG. 5 is a flow chart illustrating an exemplary process for affecting user associations in OTT service platforms according to an embodiment of the subject matter described herein. In some embodiments, the exemplary process described herein, or portions thereof, may be performed by OSA module 206 and/or OSP node 110. In step 500, a first message for initiating associations or disassociations between a first user and a second user of OTT service platforms may be received. The OTT service platforms may be controlled and operated by distinct entities. For example, a first user may be in a voice call with a second user. During the voice call, the first user may interact with a user interface running a user device. For example, the first user may press a soft button or key labeled 'Befriend' or 'Follow' to initiate generating and sending a first message. The first message may be for indicating that the first user should be associated with the second user in various OTT service platforms (e.g., Facebook, Google+, Twitter, etc.). In another example, the first user may be viewing a list of contacts containing the second user or may be reading an email from the second user. The first user may interact with a user interface running on the user device to generate and send the first message.

In some embodiments, initiating associations or disassociations between a first user and a second user includes initiating the following or un-following of the second user by the first user via a new user device or application. For example, prior to a communications interaction between a first user and a second user, the first user and the second user may be associated with or in an OTT service platform (e.g., friends on Facebook). However, a user device of the first user or an application executing on the user device of the first user may not be configured to receive status information or other information about the second user. The first user may send an association establishing message or an association disestablishing message that initiates the following or un-following of the second user such that the user device or the application (e.g., a blended communications application) executing on the first device receives or stops receiving social information (e.g., tweets, pictures, and/or recent wall posts) about the second user during a communications event or interaction.

In step 502, the OTT service platforms in which associations are to be established or disestablished may be determined using at least one of information in the first message and stored information. The stored information may include social interaction information of at least one of the first user and the second user (e.g., in database 208). The first message may include a user identifier, a phone number, a social network user identifier, a list of allowed social networks, and/or a list of excluded social networks. For example, the first message may include user identifiers for a first user and a second user, such as a phone number, a mobile subscriber ISDN number (MSISDN), or an IMSI. In response to querying a database using the identifiers or information derived from the identifiers as keys, a set of OTT service platforms associated with the first user and a set of OTT service platforms associated with the second user may be retrieved. The two sets may be compared to identify a set of common OTT service platforms (e.g., OTT service platforms of which both users are associated).

In step 504, at least a second message for establishing or disestablishing an association between the first user and the second user in the OTT service platforms may be sent. Exemplary second messages may include a status information message, an association establishing message, an association disestablishing message, a friend request message, a de-friend request message, a contact connection message, a contact disconnection message, a registration message, a deregistration message, a follow request message, and/or an un-follow request message. For example, if a first user and a second user are to be associated (e.g., friends or followers) in Facebook and Twitter, OSA module 206 may send a friend request for creating a Facebook association between the first user and the second user. OSA module 206 may also send a follow request message for creating a Twitter follower association between the first user and the second user. In another example, where a first user and a second user are already associated in an OTT service platform but social information is not being received via a user device, in response to receiving a first message indicating a following request, OSA module 206 may determine and store the user association with the user device (e.g., in database 208). OSA module 206 may then retrieve and provide social information to the user device).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method, comprising:
   receiving a first message configured to request a disassociation between users of one or more of a plurality of over the top (OTT) service platforms, wherein the first message is received during a voice communication between the users and includes an event trigger specifying when the disassociation is to be initiated, wherein the voice communication is provided by a communications network provider and each OTT service platform is provided by a different entity distinct from the communications network provider, wherein the users include at least a first user and a second user of the one or more of the plurality of OTT service platforms, wherein the users are associated with one another in the one or more of the plurality of OTT service platforms, wherein the event trigger includes a user-selected number of voice communications between the users after which the second message is automatically sent to the one or more of the plurality of OTT service platforms, wherein the first message includes an identification of the second user, wherein the identification of the second user is obtained from a phone contact list stored in a mobile device operated by the first user, and wherein the first message does not use an application program interface (API) of any of the one or more of the plurality of OTT service platforms;

identify, using at least one of information in the first message or stored information, the one or more of the plurality of OTT service platforms in which disassociations are to be made; and in response to the event trigger, send at least a second message to the one or more of the plurality of OTT service platforms, the second message using the API and configured to initiate the disassociation between the users in the one or more of the plurality of OTT service platforms.

2. A system, comprising:

a processor; and a memory coupled to the processor, the memory having program instructions stored thereon that, upon execution by the processor, cause the system to:

receive a first message configured to request a disassociation between users of one or more of a plurality of over the top (OTT) service platforms, wherein the first message is received during a voice communication between the users and includes an event trigger specifying when the disassociation is to be initiated, wherein the voice communication is provided by a communications network provider and each OTT service platform is provided by a different entity distinct from the communications network provider, wherein the users include at least a first user and a second user of the one or more of the plurality of OTT service platforms, wherein the users are associated with one another in the one or more of the plurality of OTT service platforms, wherein the event trigger includes a user-selected number of voice communications between the users after which the second message is automatically sent to the one or more of the plurality of OTT service platforms, wherein the first message includes an identification of the second user, wherein the identification of the second user is obtained from a phone contact list stored in a mobile device operated by the first user, and wherein the first message does not use an application program interface (API) of any of the one or more of the plurality of OTT service platforms;

identify, using at least one of information in the first message or stored information, the one or more of the plurality of OTT service platforms in which disassociations are to be made; and in response to the event trigger, send at least a second message to the one or more of the plurality of OTT service platforms, the second message using the API and configured to initiate the disassociation between the users in the one or more of the plurality of OTT service platforms.

3. The system of claim 2, wherein initiating the disassociation between the users includes terminating the following of the second user by the first user via a new user device or an application.

4. The system of claim 2, wherein the event trigger includes a user-selected period of time after which the second message is automatically sent to the one or more of the plurality of OTT service platforms.

5. The system of claim 2, wherein the information in the first message includes a list of excluded social networks.

6. The system of claim 2, wherein identifying the one or more of the plurality of OTT service platforms includes:

identifying, using a first user identifier in the first message, a first set of OTT service platforms associated with the first user;

identifying, using a second user identifier in the first message, a second set of OTT service platforms associated with the second user; and determining the OTT service platforms that are common to the first set and the second set.

7. The system of claim 6, wherein identifying, using the first user identifier in the first message, the first set of OTT service platforms associated with the first user includes performing, using the first user identifier as a key, a lookup in a data structure containing social interaction information of the first user and the second user.

8. The system of claim 6, wherein identifying, using the first user identifier in the first message, the first set of OTT service platforms associated with the first user includes requesting information from the first user regarding the first set of OTT service platforms.

9. The system of claim 2, wherein sending the second message includes sending an association disestablishing message, a de-friend request message, a contact disconnection message, a deregistration message, or an un-follow request message.

10. The system of claim 2, wherein at least one of the plurality of OTT service platforms includes an email service platform, an instant messaging service platform, a social networking service platform, a media hosting service platform, a business networking service platform, a media streaming service platform, or a voice over Internet Protocol (VoIP) service platform.

11. A memory device having program instructions stored thereon that, upon execution by a processor of a computer system, causes the computer system to:

receive a first message configured to request a disassociation between users of one or more of a plurality of over the top (OTT) service platforms, wherein the first message is received during a voice communication between the users and includes an event trigger specifying when the disassociation is to be initiated, wherein the voice communication is provided by a communications network provider and each OTT service platform is provided by a different entity distinct from the communications network provider, wherein the users include at least a first user and a second user of the one or more of the plurality of OTT service platforms, wherein the users are associated with one another in the one or more of the plurality of OTT service platforms, wherein the event trigger includes a user-selected number of voice communications between the users after which the second message is automatically sent to the one or more of the plurality of OTT service platforms, wherein the first message includes an identification of the second user, wherein the identification of the second user is obtained from a phone contact list stored in a mobile device operated by the first user, and wherein the first message does not use an application program interface (API) of any of the one or more of the plurality of OTT service platforms;
  identify, using at least one of information in the first message or stored information, the one or more of the plurality of OTT service platforms in which disassociations are to be made; and
  in response to the event trigger, send at least a second message to the one or more of the plurality of OTT service platforms, the second message using the API and configured to initiate the disassociation between the users in the one or more of the plurality of OTT service platforms.

12. The memory device of claim 11, wherein initiating the disassociation between the users includes terminating the following of the second user by the first user via a new user device or an application.

13. The memory device of claim 11, wherein the event trigger includes a user-selected period of time after which the second message is automatically sent to the one or more of the plurality of OTT service platforms.

14. The memory device of claim 11, wherein the information in the first message includes a list of excluded social networks.

15. The memory device of claim 11, wherein identifying the one or more of the plurality of OTT service platforms includes:
  identifying, using a first user identifier in the first message, a first set of OTT service platforms associated with the first user;
  identifying, using a second user identifier in the first message, a second set of OTT service platforms associated with the second user; and
  determining the OTT service platforms that are common to the first set and the second set.

16. The memory device of claim 15, wherein identifying, using the first user identifier in the first message, the first set of OTT service platforms associated with the first user includes performing, using the first user identifier as a key, a lookup in a data structure containing social interaction information of the first user and the second user.

17. The memory device of claim 15, wherein identifying, using the first user identifier in the first message, the first set of OTT service platforms associated with the first user includes requesting information from the first user regarding the first set of OTT service platforms.

18. The memory device of claim 11, wherein sending the second message includes sending an association disestablishing message, a de-friend request message, a contact disconnection message, a deregistration message, or an un-follow request message.

19. The memory device of claim 11, wherein at least one of the plurality of OTT service platforms includes an email service platform, an instant messaging service platform, a social networking service platform, a media hosting service platform, a business networking service platform, a media streaming service platform, or a voice over Internet Protocol (VoIP) service platform.

* * * * *